United States Patent
Ando et al.

(10) Patent No.: US 7,982,938 B2
(45) Date of Patent: Jul. 19, 2011

(54) OPTICAL MASK, AND LIGHT SOURCE DEVICE

(75) Inventors: Taro Ando, Hamamatsu (JP); Yoshiyuki Ohtake, Hamamatsu (JP); Takashi Inoue, Hamamatsu (JP); Naoya Matsumoto, Hamamatsu (JP); Haruyoshi Toyoda, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 12/680,783

(22) PCT Filed: Jun. 26, 2008

(86) PCT No.: PCT/JP2008/061655
§ 371 (c)(1),
(2), (4) Date: Mar. 30, 2010

(87) PCT Pub. No.: WO2009/057349
PCT Pub. Date: May 7, 2009

(65) Prior Publication Data
US 2010/0214640 A1 Aug. 26, 2010

(30) Foreign Application Priority Data
Oct. 29, 2007 (JP) .................. 2007-280845

(51) Int. Cl.
*G02B 26/00* (2006.01)
*G02B 26/02* (2006.01)

(52) U.S. Cl. .................. 359/238; 359/227; 359/237

(58) Field of Classification Search .............. 359/227, 359/237–238, 556, 559
See application file for complete search history.

(56) References Cited

U.S. PATENT DOCUMENTS

| 5,481,393 A | 1/1996 | Kashima et al. |
| 5,502,001 A | 3/1996 | Okamoto |
| 5,969,853 A * | 10/1999 | Takaoka ............ 359/370 |
| 6,130,701 A | 10/2000 | Ito |

FOREIGN PATENT DOCUMENTS

| JP | 05-002152 | 1/1993 |
| JP | 06-148573 | 5/1994 |

(Continued)

OTHER PUBLICATIONS

J. Arlt et al., "The production of multiringed Laguerre-Gaussian modes by computer-generated holograms," Journal of Modern Optics, 1998, vol. 45, No. 6, pp. 1231-1237.

(Continued)

*Primary Examiner* — Dawayne A Pinkney
(74) *Attorney, Agent, or Firm* — Drinker Biddle & Reath LLP

(57) ABSTRACT

This optical mask is an optical mask which applies spatial intensity modulation to input light in a beam cross-section and outputs a light after being subjected to the modulation, and when regions $A_0$ to $A_p$ defined by circumferences with p radiuses $r_1$ to $r_p$ (p is an even number, $r_p > r_{p-1} > \ldots > r_2 > r_1$, and $r_p - r_{p-1} > r_{p-1} - r_{p-2} > \ldots > r_3 - r_2 > r_2 - r_1 > r_1$) around a predetermined position are set in order from an inner side, a region $A_m$ (m is an even number not less than 0 and not more than p) is a light transmission region, and a region $A_n$ (n is an odd number not less than 0 and not more than p) is a light shielding region.

6 Claims, 14 Drawing Sheets

FOREIGN PATENT DOCUMENTS

| | | |
|---|---|---|
| JP | 10-058743 | 3/1998 |
| JP | 2003-043347 | 2/2003 |

OTHER PUBLICATIONS

D. Grier, "A revolution in optical manipulation," Nature, Aug. 14, 2003, vol. 424, pp. 810-816.

M. Beijersbergen et al., "Helical-wavefront laser beams produced with a spiral phaseplate," Optics Communications, 1994, vol. 112, pp. 321-327.

K. Sueda et al., "Laguerre-Gaussian beam generated with a multi-level spiral phase plate for high intensity laser pulses," Optics Express, Jul. 26, 2004, vol. 12, No. 15, pp. 3548-3553.

N. Heckenberg et al., "Generation of optical phase singularities by computer-generated holograms," Optics Letters, Feb. 1, 1992, vol. 17, No. 3, pp. 221-223.

N. Heckenberg et al., "Laser beams with phase singularities," Optical and Quantum Electronics, 1992, vol. 24, No. 9, pp. S951-S962.

M. Martinez-Corral et al., "Reduction of focus size in tightly focused linearly polarized beams," Applied Physics Letters, Nov. 8, 2004, vol. 85, No. 19, pp. 4319-4321.

R. Dorn et al., "Sharper Focus for a Radially Polarized Light Beam," Physical Review Letters, Dec. 5, 2003, vol. 91, No. 23, pp. 233901-1 through 233901-4.

S. Quabis et al., "Focusing light to a tighter spot," Optics Communications, May 25, 2000, vol. 179, pp. 1-7.

Y. Kozawa et al., "Sharper focal spot formed by higher-order radially polarized laser beams," J. Opt. Soc. Am. A, Jun. 2007, vol. 24, No. 6, pp. 1793-1798.

* cited by examiner $r_1/w=0.5412$
$r_2/w=1.3066$
$\beta \approx 2.0$ $r_1/w=0.3338$
$r_2/w=0.7710$
$r_3/w=1.2233$
$r_4/w=1.6993$
$r_5/w=2.2178$
$r_6/w=2.8269$
$\beta \approx 3.8$

OPTICAL MASK, AND LIGHT SOURCE DEVICE

TECHNICAL FIELD

The present invention relates to an optical mask which applies spatial intensity modulation to input light in a beam cross-section and outputs the light after being subjected to the modulation, and a light source device including this optical mask.

BACKGROUND ART

When an object to be observed is observed or an object to be processed is processed, light output from a light source such as a laser light source is condensed and irradiated onto the object to be observed or the object to be processed through a condensing irradiation optical system including lenses, etc. In such a case where light is condensed, it is known that a beam waist diameter as a standard of the size of a condensed light diameter can be reduced only to approximately half of the light wavelength. This is called the diffraction limit. However, this diffraction limit is in the case of Gaussian mode (or fundamental mode) light. On the other hand, the presence of high-order mode light with a spatial structure finer than the diffraction limit is known.

As light beams with this property, a Bessel beam and Laguerre-Gaussian mode light (hereinafter, referred to as "LG mode light") are known. By using such a light beam, the energy of the light can be effectively concentrated at a minute region not more than the diffraction limit. For example, in Non-Patent Documents 1 to 6, light source devices which output LG mode light are described.

In Non-Patent Document 7, a technique for forming a minute spot by condensing linearly polarized light with a uniform distribution by using a three-ring (3R) filter is described. Further, in Non-Patent Documents 8 to 10, a technique for forming a minute spot by condensing a radially polarized laser beam by a high-NA lens is described.

Non-Patent Document 1: J. Arlt, et al., Journal of Modern Optics, Vol. 45, No. 6, pp. 1231-1237 (1998).
Non-Patent Document 2: D. G Grier, Nature, Vol. 424, pp. 810-816 (2003).
Non-Patent Document 3: M. W. Beijersbergen, et al., Optics Communications, Vol. 112, pp. 321-327 (1994).
Non-Patent Document 4: K. Sueda, et al., Optics Express, Vol. 12, No. 15, pp. 3548-3553 (2004).
Non-Patent Document 5: N. R. Heckenberg, et al., Optics Letters, Vol. 17, No. 3, pp. 221-223 (1992).
Non-Patent Document 6: N. R. Heckenberg, et al., Optical and Quantum Electronics, Vol. 24, No. 9, pp. S951-S962 (1992).
Non-Patent Document 7: M. Martinez-Corral, et al., Appl. Phys. Lett. Vol. 85, No. 19, pp. 4319-4321 (2004).
Non-Patent Document 8: R. Dorn, et al., Phys. Rev. Lett. Vol. 91, No. 23, p. 233901 (2003).
Non-Patent Document 9: S. Quabis, et al., Opt. Commun. Vol. 179, pp. 1-7 (2000).
Non-Patent Document 10: Y. Kozawa, et al., J. Opt. Soc. Am. A, Vol. 24, No. 6, pp. 1793-1798 (2007).

DISCLOSURE OF THE INVENTION

Problem to be Solved by the Invention

The LG mode light as described in Non-Patent Documents 1 to 6 inherently has a ring-shaped region (hereinafter, referred to as "side lobe") around the central spot in the light beam cross-section, so that there are the problems that its resolution is low and the degree of energy concentration on the central spot is low. Even by the technique described in Non-Patent Document 7, these problems cannot be sufficiently solved in regard to both the central spot diameter and side lobe.

The technique described in Non-Patent Documents 8 to 10 uses the properties unique to the radially polarized laser beam, so that it cannot be applied to a linearly polarized beam. This technique is a phenomenon effective only with high NA, and cannot be realized with low NA. Further, this technique condenses only light on the outer periphery of a lens, so that light use efficiency is very low.

The present invention was made for solving the above-described problems, and an object thereof is to provide a light source device which can reduce a central spot diameter and increase the degree of energy concentration at a central spot, and an optical mask to be preferably used in such a light source device.

Means for Solving the Problems

An optical mask of the present invention is an optical mask which applies spatial intensity modulation to input light in a beam cross-section and outputs a light after being subjected to the modulation, and when regions $A_0$ to $A_p$ defined by circumferences with p radiuses $r_1$ to $r_p$ (p is an even number, $r_p > r_{p-1} > \ldots > r_2 > r_1$, and $r_p - r_{p-1} > r_{p-1} - r_{p-2} > \ldots > r_3 - r_2 > r_2 - r_1$) around a predetermined position are set in order from an inner side, a region $A_m$ (m is an even number not less than 0 and not more than p) is a light transmission region, and a region $A_n$ (n is an odd number not less than 0 and not more than p) is a light shielding region. In the above-described optical mask, the p radiuses $r_1$ to $r_p$ are preferably in proportion to square roots of p real roots of a p-order Laguerre polynomial.

A light source device of the present invention includes a light source which outputs coherent light, a condensing optical system which condenses light output from the light source to a focal point, and the optical mask of the present invention provided on a light path between the light source and the focal point. Further, light output from the light source enters the regions $A_0$ to $A_p$ and the optical mask outputs light transmitted through the light transmission regions.

The above-described light source device preferably further includes an optical phase modulation element which is provided between the light source and the optical mask, wherein light output from the light source enters the optical phase modulation element, wherein the optical phase modulation element applies phase modulation to the light according to positions on a beam cross-section of the light, and outputs the light after being subjected to the phase modulation, and in this case, in a beam cross-section of light which is output from the optical phase modulation element and input into the optical mask, phases of lights input into the light transmission region and the light shielding region, respectively, are preferably different by it from each other.

In the light source device described above, the optical phase modulation element preferably outputs LG mode light with a radial index p by applying phase modulation to input light.

In the light source device described above, the optical phase modulation element is preferably an element having phase modulation amounts of pixels set based on a control signal input from an outside.

Effect of the Invention

According to the present invention, the central spot diameter can be reduced, and the degree of energy concentration at the central spot can be increased.

DESCRIPTION OF SYMBOLS

Figure 1:
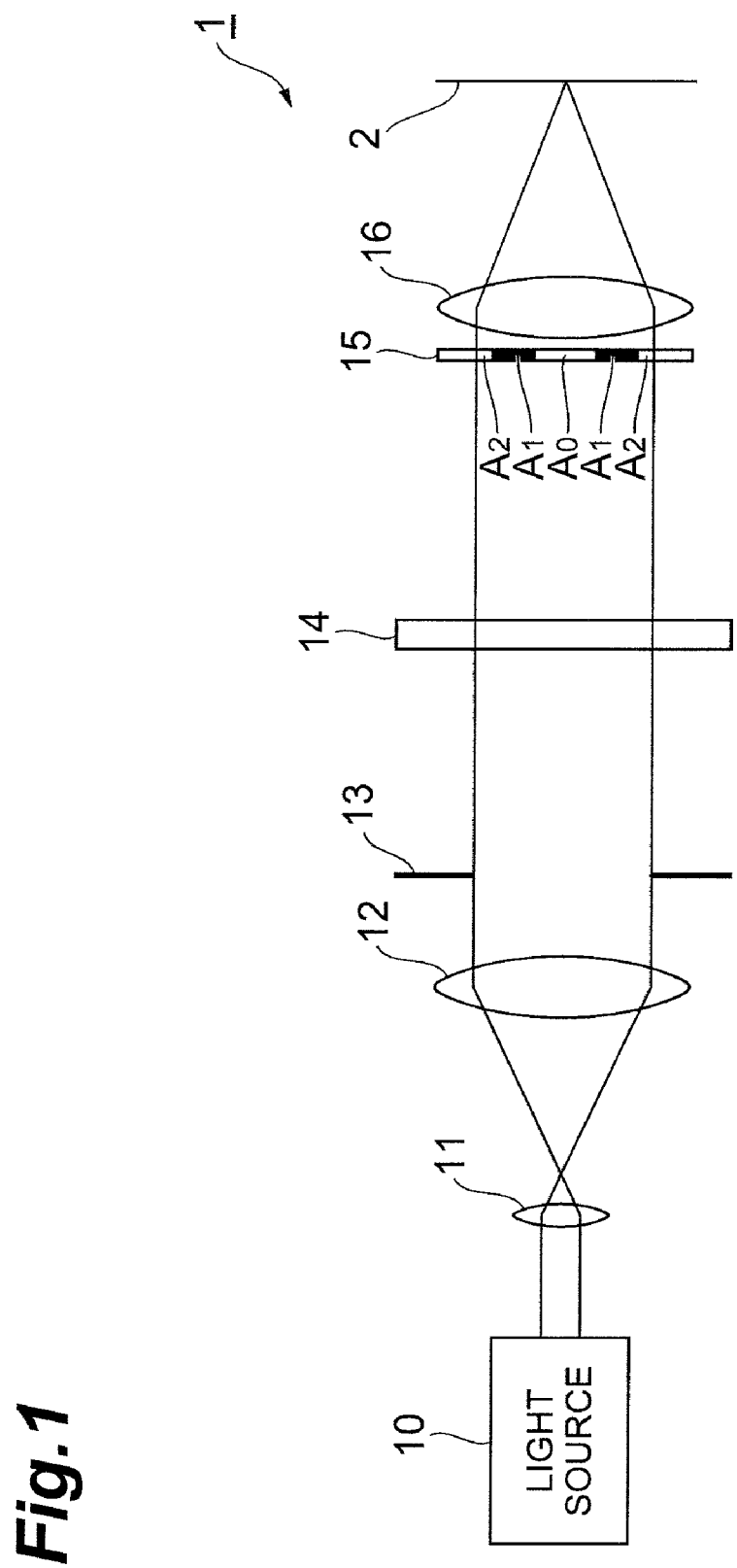
FIG. 1 is a configuration view of a light source device 1 of the present embodiment.

1: Light source device, 2: Focal plane, 10: Laser light source, 11, 12: Lens, 13: Aperture, 14: Optical phase modulation element, 15: Optical mask, 16: Lens.

BEST MODES FOR CARRYING OUT THE INVENTION

Hereinafter, a best mode for carrying out the present invention will be described in detail with reference to the accompanying drawings. In the description of the drawings, the same components will be designated with the same reference numerals, and overlapping description will be omitted.

Figure 2:
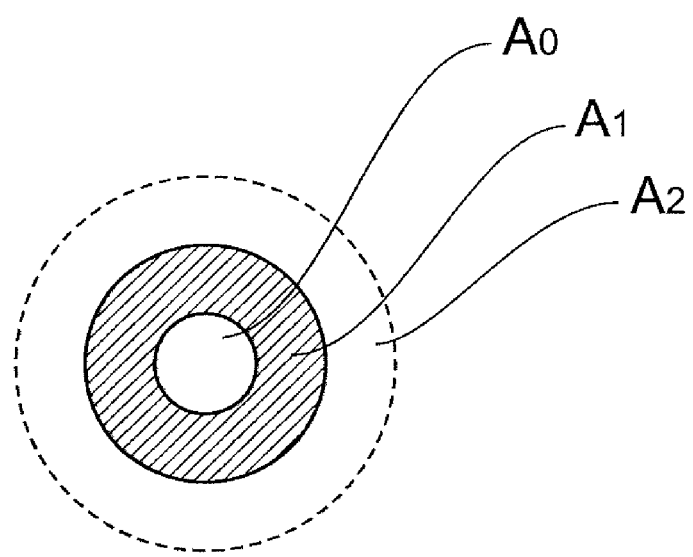
FIG. 2 is a plan view of an optical mask 15 of the present embodiment.

FIG. 1 is a configuration view of a light source device 1 of the present embodiment. The light source device 1 shown in this figure includes a laser light source 10, a convex lens 11, a convex lens 12, an aperture 13, a transmissive optical phase modulation element 14, an optical mask 15, and a convex lens 16. FIG. 2 is a plan view of the optical mask 15 of the present embodiment. In FIG. 2, the optical mask 15 is viewed in the optical axis direction.

The laser light source 10 outputs coherent laser light, and is, for example, an He—Ne laser light source. The lens 11 and the lens 12 serve as beam expanders, and light output from the laser light source 10 enters the lens 11 and the lens 12. The lens 11 and the lens 12 expand the beam diameter of the light, and output this light as parallel light. The aperture 13 has a circular opening and light output from the lens 11 and the lens 12 enters the aperture 13. The aperture 13 outputs a portion passing through the opening in a beam cross-section of the light to the optical phase modulation element 14.

Light which was output from the laser light source 10 and passed through the opening of the aperture 13 through the lenses 11 and 12 enters the optical phase modulation element 14. The optical phase modulation element 14 applies phase modulation to the light according to a position on the beam cross-section of the light, and transmits and outputs the light after being subjected to the phase modulation through the optical mask 15. The optical phase modulation element 14 may be provided with a thickness distribution by machining the surface of a glass plate, etc., however, preferably, the optical phase modulation element 14 is a spatial light modulator (SLM) in which phase modulation amounts of pixels for transmission are set based on a control signal output from the outside. When an SLM is used as the optical phase modulation element 14, a spatial distribution of the phase modulation amounts can be electrically written, and various phase modulation distributions can be provided as appropriate.

Light subjected to phase modulation by the optical phase modulation element 14 enters the optical mask 15. The optical mask 15 applies spatial intensity modulation in the beam cross-section of the light and outputs the light after being subjected to the modulation to the lens 16. The lens 16 serves as a condensing optical system which condenses light output from the optical mask 15 onto a focal plane 2. The focal plane 2 is, for example, an object to be observed or an object to be processed.

As shown in FIG. 2 as well, in the optical mask 15, when regions $A_0$ to $A_p$ defined by circumferences with p radiuses $r_1$ to $r_p$ around a predetermined position (position which the principal ray passes through) are set in order from the inner side, a region $A_m$ (m is an even number not less than 0 and not more than p) is a light transmission region, and a region $A_n$ (n is an odd number not less than 0 and not more than p) is a light shielding region. In FIG. 1 and FIG. 2, p value is set to 2. Here, p is an even number, and satisfies "$r_p > r_{p-1} > \ldots > r_2 > r_1$," and "$r_p - r_{p-1} > r_{p-1} - r_{p-2} > \ldots > r_3 - r_2 > r_2 - r_1 > r_1$."

Figure 3:
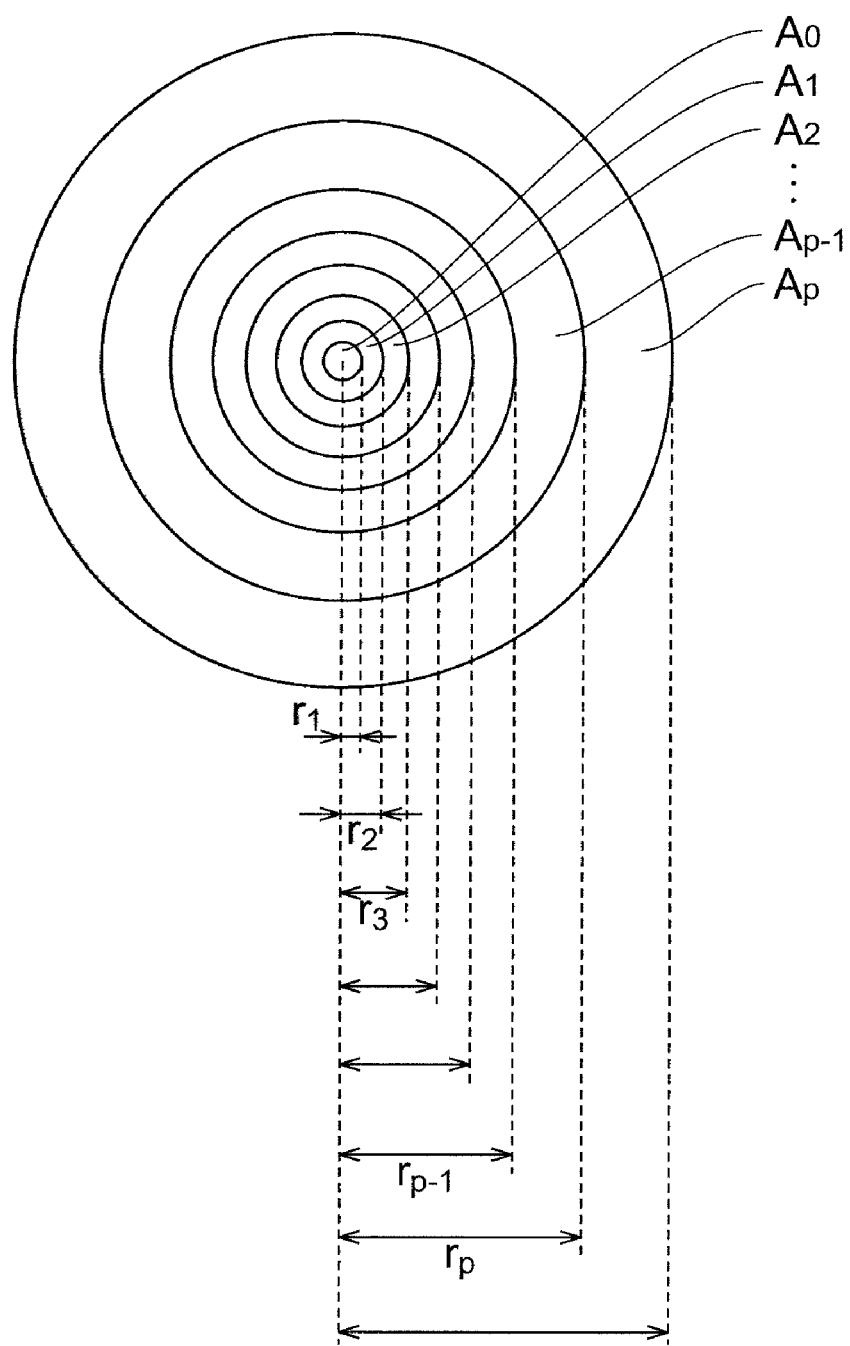
FIG. 3 is a plan view of the optical mask 15 of the present embodiment.

The optical mask 15 will be described in greater detail with reference to FIG. 3. FIG. 3 is a plan view of the optical mask 15 of the present embodiment. In FIG. 3, the optical mask 15 is also viewed in the optical axis direction. As shown in this figure, in the optical mask 15, (p+1) regions $A_0$ to $A_p$ defined by the circumferences with p radiuses $r_1$ to $r_p$ around the predetermined position are set. Regions $A_0, A_1, A_2, \ldots, A_p$ are set in order from the inner side. p is an even number. The innermost region $A_0$ is a region inside the circumference with the radius $r_1$. The outermost region $A_p$ is a region outside the circumference with the radius $r_p$. Each region $A_i$ between the region $A_0$ and the region $A_p$ is an annular region defined by a circumference with a radius $r_i$ and a circumference with a radius $r_{i+1}$ (i=1, 2, 3, ..., p−1).

In this case, the regions $A_0$ to $A_p$, respectively, have radial widths so that the outer region has the wider radial width. That is, the radiuses $r_1$ to $r_p$ satisfy the relational expression shown below. For the innermost region $A_0$, the radius $r_1$ is the radial width. A region $A_m$ (m is an even number not less than 0 and not more than p) is a light transmission region, and a region $A_n$ (n is an odd number not less than 0 and not more than p) is a light shielding region. The outermost region $A_p$ is a light transmission region.

[Numerical formula 1]

$$r_p - r_{p-1} > r_{p-1} - r_{p-2} > \ldots > r_2 - r_1 > r_1 \quad (1)$$

The p radiuses $r_1$ to $r_p$ which should be set in the radial direction r are set as follows. The radiuses $r_1$ to $r_p$ are present in portions ("nodes") in which the light intensity becomes zero. Nodes of the light intensity distribution can be obtained from the zero point of the Laguerre polynomial $S_p(z)$ expressed as Numerical formula (2). p is called a radial index, and is generally a natural number, and is a positive even number in the present embodiment. The Laguerre polynomial is a p-order polynomial, and has p different positive real roots $a_1$ to $a_p$. By using these roots $a_i$ and the light beam waist radius w, the radius $r_i$ is expressed as Numerical formula (3) (i=1, 2, 3, ..., p). That is, the p radiuses $r_1$ to $r_p$ are in proportion to square roots of p real roots of the p-order Laguerre polynomial.

[Numerical formula 2]

$$S_p(z) = \sum_{k=0}^{p} \frac{(-1)^k \cdot p!}{(p-k)! \cdot (k!)^2} \cdot z^k \quad (2)$$

[Numerical formula 3]

$$r_i = w\sqrt{\frac{a_i}{2}} \quad (3)$$

$$(i = 1, 2, \ldots, p)$$

In the configuration shown in FIG. 1, light input into the optical mask 15 may have a fixed phase in the beam cross-section, however, preferably, the light has a phase which differs by π between two regions neighboring each other of the (p+1) regions $A_0$ to $A_p$. That is, preferably, the phase of the light to be input into the even-number-th light transmission regions $A_0, A_2, \ldots, A_p$ is mutually different by π from the phase of the light to be input into the odd-number-th light shielding regions $A_1, A_3, \ldots, A_{p-1}$. The phase modulation amount $\phi_0$ in the even-number-th light transmission regions $A_0, A_2, \ldots, A_p$, respectively, is fixed. The phase modulation amount $\phi_1$ in the odd-number-th light shielding regions $A_1, A_3, \ldots, A_{p-1}$, respectively, is fixed. The phase modulation amount $\phi_0$ is mutually different by π from the phase modulation amount $\phi_1$. The light which is subjected to this optical phase modulation by the optical phase modulation element 14 to be output is LG mode light with a radial index of p and a deflection index of 0.

The light source device 1 of the present embodiment operates as follows. Coherent laser light output from the laser light source 10 is expanded in beam diameter by the convex lens 11 and the convex lens 12, and then a part of the beam cross-section passes through the circular opening of the aperture 13 so that a circular beam cross-section is formed, and then the laser light is input into the optical phase modulation element 14. The light input into the optical phase modulation element 14 is subjected to optical phase modulation according to positions on the beam cross-section by this optical phase modulation element 14, and output as LG mode light with a radial index of p and a deflection index of 0.

The LG mode light output from the optical phase modulation element 14 is input into the optical mask 15. At this time, the phase modulation amount $\phi_0$ of light to be input into the light transmission regions $A_0, A_2, \ldots, A_p$ of the optical mask 15 is fixed, the phase modulation amount $\phi_1$ of light to be input into the light shielding regions $A_1, A_3, \ldots, A_{p-1}$ of the optical mask 15 is fixed, and the phase modulation amount $\phi_0$ is mutually different by π from the phase modulation amount $\phi_1$. Therefore, light to be output from the optical mask 15 of the LG mode light input into the optical mask 15 is selectively transmitted through the light transmission regions $A_0, A_2, \ldots, A_p$, and the phase modulation amount $\phi_0$ is fixed. Light to be output from the optical mask 15 has concentric rings transmitted through the light transmission regions $A_2, \ldots, A_p$, respectively, in addition to the central spot transmitted through the light transmission region $A_0$ in the beam cross-section. This light output from the optical mask 15 is condensed onto the focal plane 2 by the lens 16.

Next, the results of numerical calculation using the vectorial Debye formula are shown. A ratio of the beam radius w of the LG mode light to the radius of the entrance pupil of the lens 16 is represented as β (=entrance pupil radius/LG mode light radius). "Focal point" is set at the geometric posterior focal point position of the lens 16.

Figure 4:
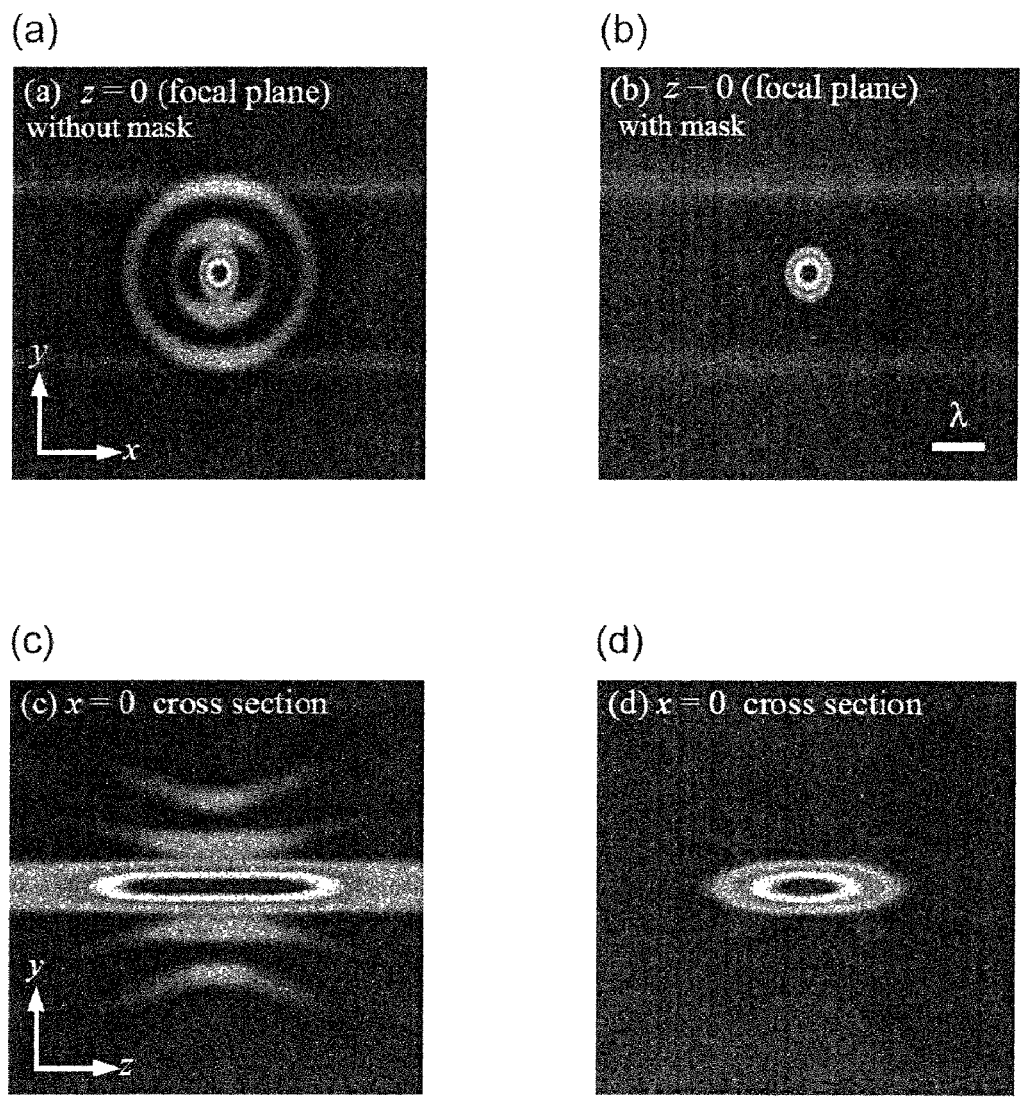
FIG. 4 is a view showing results of calculation of light intensity distributions in the vicinity of a focal point.

FIG. 4 is a view showing results of calculation of light intensity distributions in the vicinity of the focal point. The LG mode light is set as linearly polarized light, the radial index p is set to 2, and the deflection index is set to 0. β is set to 2.5, and the NA of the lens 16 is set to 0.85. FIGS. 4 (a) and (b) show light intensity distributions on a plane which includes the focal point and is perpendicular to the optical axis. FIG. 4 (a) shows a light intensity distribution in the case of a comparative example which does not use the optical mask 15. FIG. 4 (b) shows a light intensity distribution in the case of the present embodiment using the optical mask 15. FIGS. 4 (c) and (d) show light intensity distributions on a plane including the optical axis. FIG. 4 (c) shows a light intensity distribution in the case of a comparative example which does not use the optical mask 15. FIG. 4 (d) shows a light intensity distribution in the case of the present embodiment using the optical mask 15.

In comparison with the comparative examples which do not use the optical mask 15 (FIGS. 4 (a) and (c)), in the case of the present embodiment using the optical mask 15 (FIGS. 4 (c) and (d)), the light intensity of the side lobe around the central spot remarkably decreases in the vicinity of the focal point, and the focal depth becomes shorter. The half maximum area as the size of the central spot (area in which the peak value of the square of the intensity halves) is slightly larger in the case of the present embodiment ($0.305\lambda^2$) than in the case of the comparative examples ($0.248\lambda^2$). Here, λ is a wavelength of light.

Figure 5:
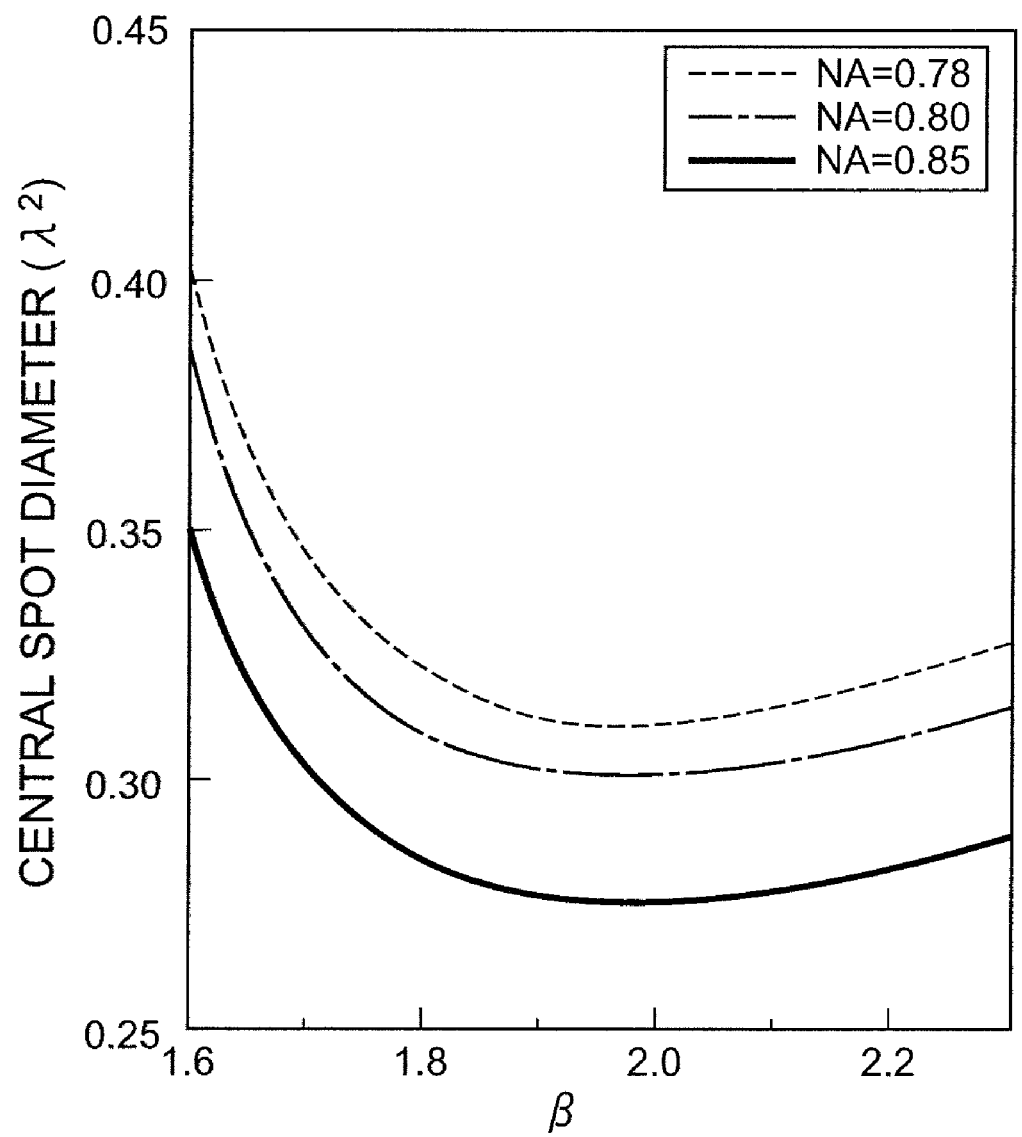
FIG. 5 is a graph showing the relationship between the central spot diameter and $\beta$.

FIG. 5 is a graph showing the relationship between the central spot diameter and β. The central spot diameter is represented by the half maximum area. The NA of the lens 16 is set to three values: 0.78, 0.80, and 0.85. From this figure, it is understood that the central spot becomes smaller as the NA of the lens 16 is increased. It is also understood that when the radial index p is 2, the central spot can be minimized in the vicinity of a position at which β is 2 regardless of the NA of the lens 16. In other words, on the condition that the radial index p is 2, the minimum spot diameter can be obtained by setting the entrance pupil diameter of the lens 16 to twice the beam diameter of the LG mode light. On the condition that the NA of the lens 16 is 0.85, the minimum spot diameter becomes $0.276\lambda^2$.

Figure 6:
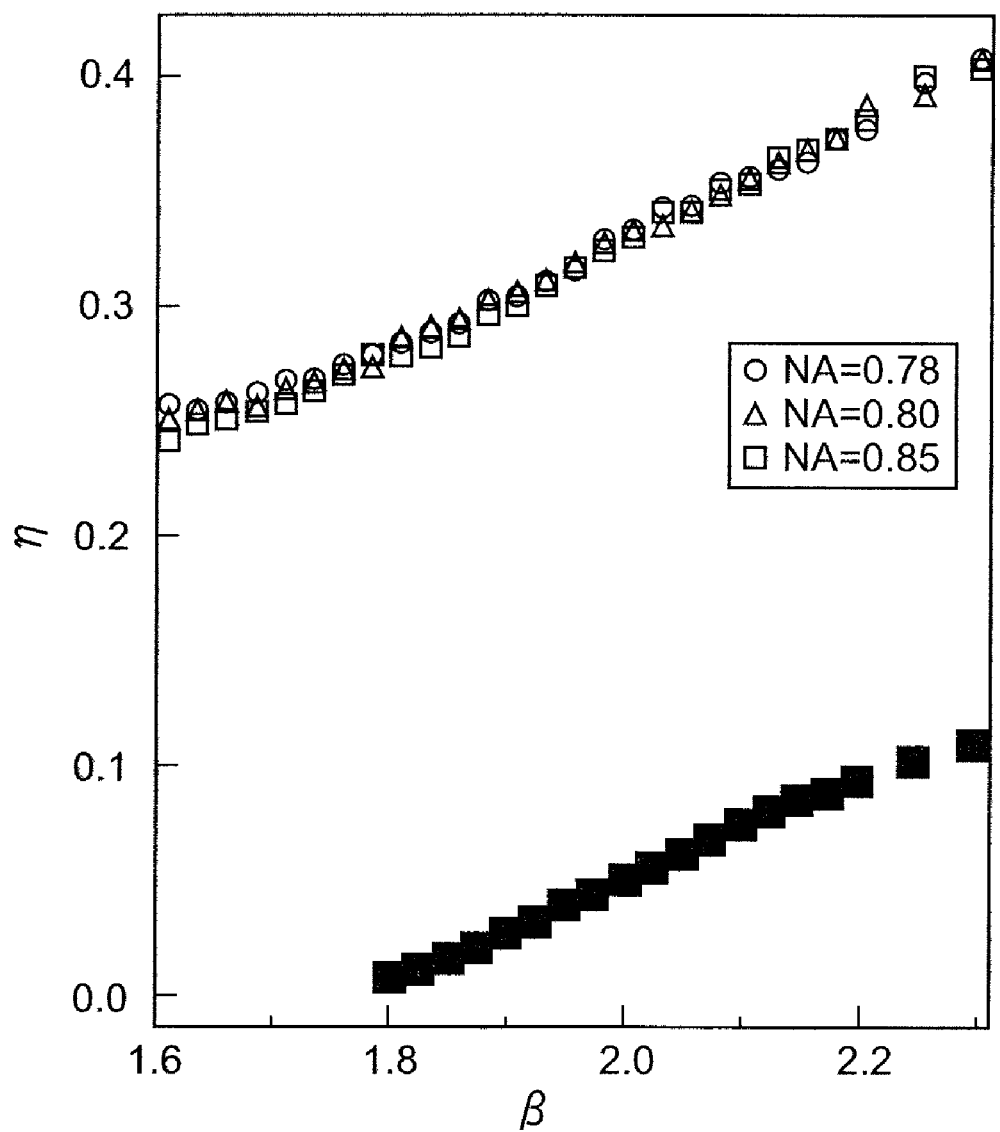
FIG. 6 is a graph showing the relationship between the degree $\eta$ of energy concentration at the central spot and $\beta$.

FIG. 6 is a graph showing the relationship between the degree η of energy concentration at the central spot and β. The degree η of energy concentration at the central spot shows the ratio of the light intensity occupied by the central spot to the light intensity of the whole. The NA of the lens 16 is set to three values: 0.78, 0.80, and 0.85. For comparison, while the NA of the lens 16 is set to these three values, the degree η of energy concentration in the case of the comparative example which does not use the optical mask 15 are also shown by black square marks. From this figure, it is understood that the degree η of energy concentration at the central spot in the present embodiment does not depend on the NA of the lens 16, and this is the same as in the comparative example. However, it is also understood that the degree η of energy concentration at the central spot in the present embodiment can be improved by approximately 30% in comparison with the case of the comparative example which does not use the optical mask 15.

Figure 7:
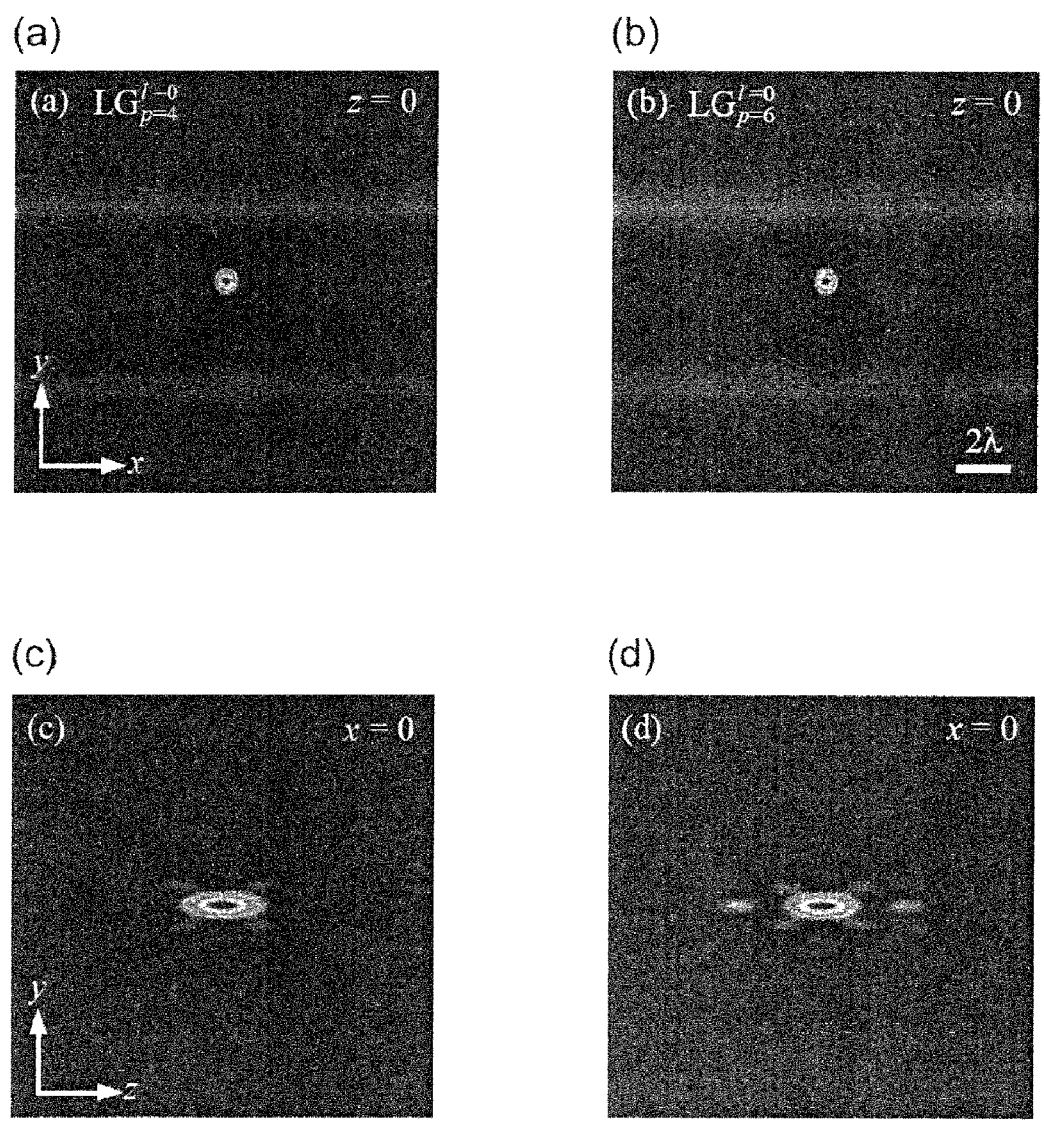
FIG. 7 is a view showing other results of calculation of light intensity distributions in the vicinity of the focal point.
Figure 8:
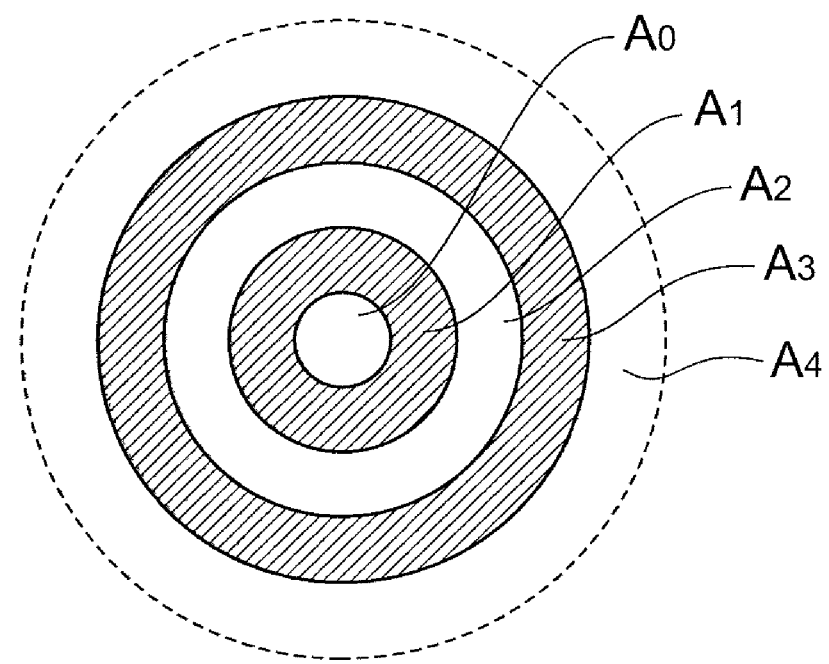
FIG. 8 is a plan view of the optical mask 15 when the radial index p is set to 4.
Figure 9:
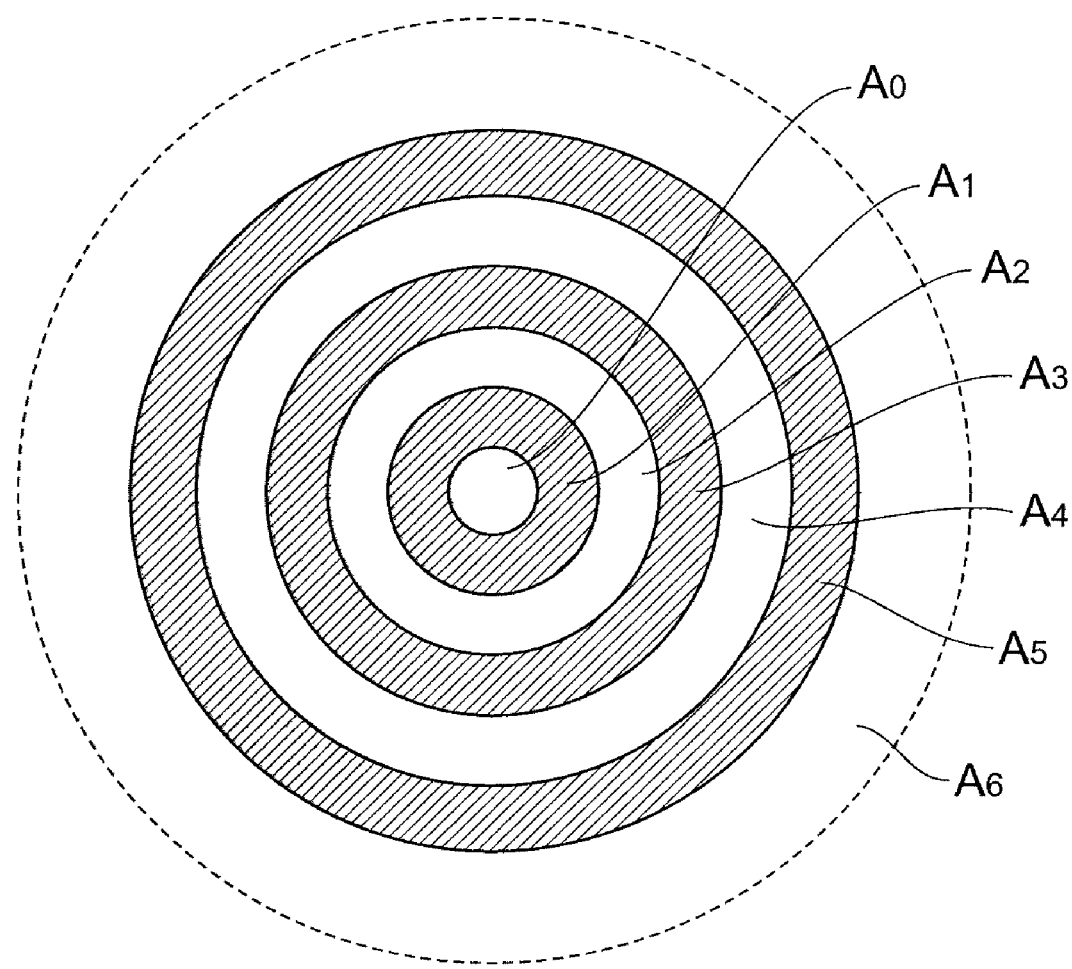
FIG. 9 is a plan view of the optical mask 15 when the radial index p is set to 6.

FIG. 7 is a view showing other results of calculation of the light intensity distributions in the vicinity of the focal point. Here, the radial index p is set to 4 or 6. FIG. 8 is a plan view of the optical mask 15 when the radial index p is set to 4. FIG. 9 is a plan view of the optical mask 15 when the radial index p is set to 6.

In each case, the NA of the lens 16 is set to 0.85. β is set to 3.3 when the radial index p is set to 4, and β is set to 3.8 when the radial index p is set to 6. FIGS. 7 (a) and (b) show light intensity distributions on a plane which includes the focal point and is perpendicular to the optical axis. FIG. 7 (a) shows a light intensity distribution when the radial index p is set to 4. FIG. 7 (b) shows a light intensity distribution when the radial index p is set to 6. FIGS. 7 (c) and (d) show light intensity distributions on a plane including the optical axis. FIG. 7 (c) shows a light intensity distribution when the radial index p is set to 4. FIG. 7 (d) shows a light intensity distribution when the radial index p is set to 6.

It is understood that the side lobe is greatly reduced in the vicinity of the focal point by using the optical mask 15 as in the present embodiment. When the radial index p is set to 4, the degree η of energy concentration at the central spot is 0.083 in the comparative example which does not use the optical mask 15, and on the other hand, it becomes 0.405 in the present embodiment using the optical mask 15. When the radial index p is set to 6, the degree η of energy concentration at the central spot is 0.054 in the comparative example which does not use the optical mask 15, and on the other hand, it becomes 0.349 in the present embodiment using the optical mask 15. In each case, the degree η of energy concentration at the central spot is greatly improved in the present embodiment using the optical mask 15.

Further, the minimum spot diameter on the condition that the NA of the lens 16 is 0.85 becomes $0.286\lambda^2$ when the radial index p is set to 4, and becomes $0.290\lambda^2$ when the radial index p is set to 6. In the technique described in Non-Patent Document 7, the minimum spot diameter obtained by using a 3R mask according to the same condition becomes $0.301\lambda^2$, and in comparison with this, the present embodiment is superior to this technique.

In the embodiment described above, a case where the NA of the lens 16 which is a condensing optical system is comparatively high and linearly polarized light is used is described. However, reduction in the central spot diameter and improvement in the degree of energy concentration at the central spot as effects of the present embodiment do not depend on the NA of the lens 16, and are effective even in a polarized state other than the linear polarization.

An example of especially effective use of the light source device 1 of the present embodiment is use for linear polarization with less fine light sources. For example, in a magneto optical disk reading system using a photomagnetic effect, components of linearly polarized light rotated by magnetism stored in the magneto optical disk are detected, and by using the light source device 1 of the present embodiment, a larger capacity can be realized.

The position of the optical mask 15 may be in front of the lens 16 as a condensing optical system as described above, or may be at the rear of the lens 16. The optical mask 15 may be formed and provided on the incidence plane or the exit plane of the lens 16. The optical phase modulation element 14 and the optical mask 15 may be formed integrally with each other, and in this case, an SLM which can apply intensity modulation and phase modulation to each pixel may be used.

In the embodiment described above, LG mode light generated by the optical phase modulation element 14 is made incident on the optical mask 15, and at the time of this incidence, the phase modulation amount $\phi_0$ of light to be input into the light transmission regions $A_0, A_2, \ldots, A_p$ of the optical mask 15 is fixed, and the phase modulation amount $\phi_1$ of light to be input into the light shielding regions $A_1, A_3, \ldots, A_{p-1}$ of the optical mask 15 is fixed, and these phase modulation amount $\phi_0$ and phase modulation amount $\phi_1$ are different by π from each other. Then, light input into the light transmission regions $A_0, A_2, \ldots, A_p$ of the light input into the optical mask 15 is selectively output from the optical mask 15.

That is, light output from the optical mask 15 has, in the beam cross-section, concentric rings transmitted through the light transmission regions $A_2, \ldots, A_p$, respectively, in addition to the central spot transmitted through the light transmission region $A_0$, and the phase modulation amount $\phi_0$ is fixed. Therefore, as described below, the light to be input into the optical mask 15 is not necessarily LG mode light, and may be light with a fixed phase in the beam cross-section. In this case, the light output from the optical mask 15 becomes the same as in the embodiment described above in the beam cross-section. Hereinafter, this case will be described.

Figure 10:
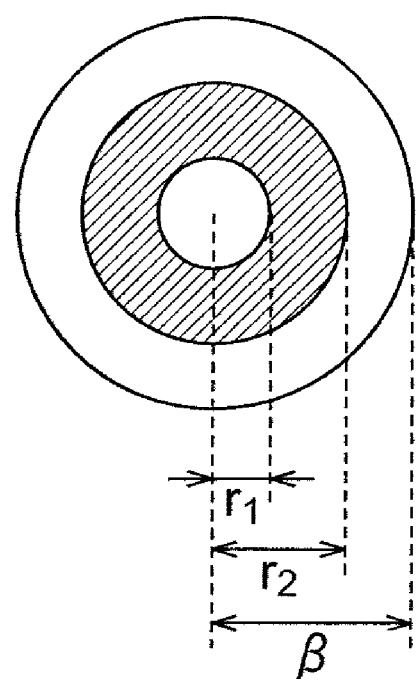
FIG. 10 is a plan view of the optical mask 15 when the radial index p is set to 2.
Figure 11:
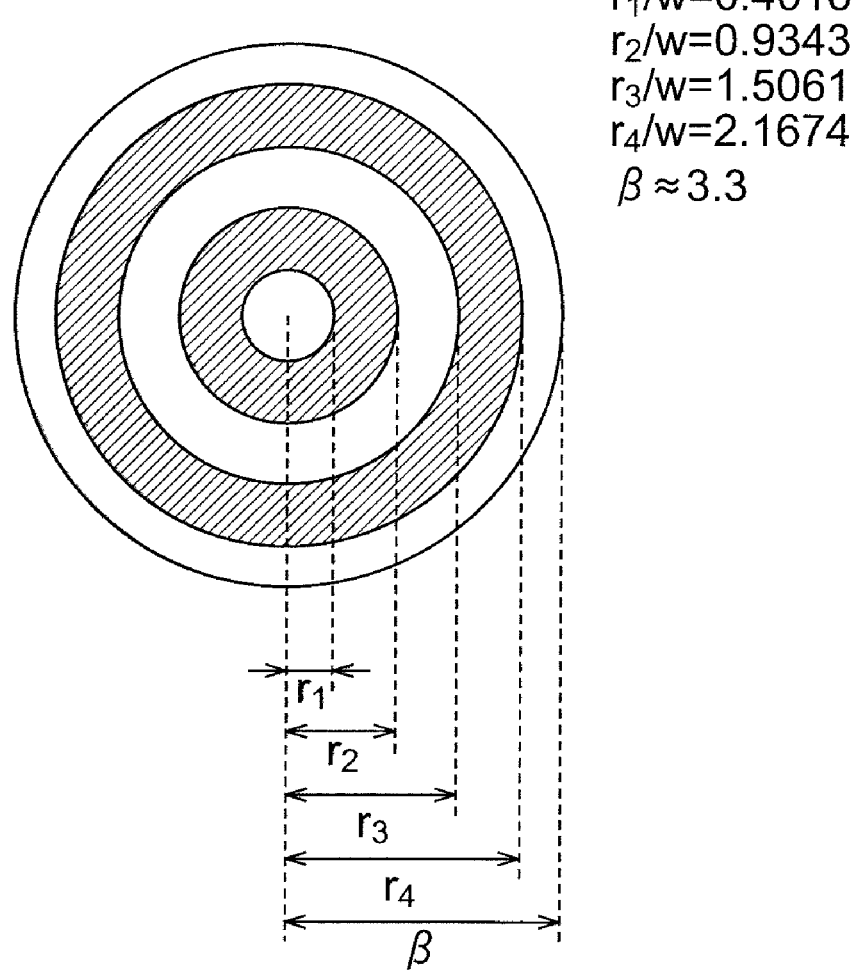
FIG. 11 is a plan view of the optical mask 15 when the radial index p is set to 4.
Figure 12:
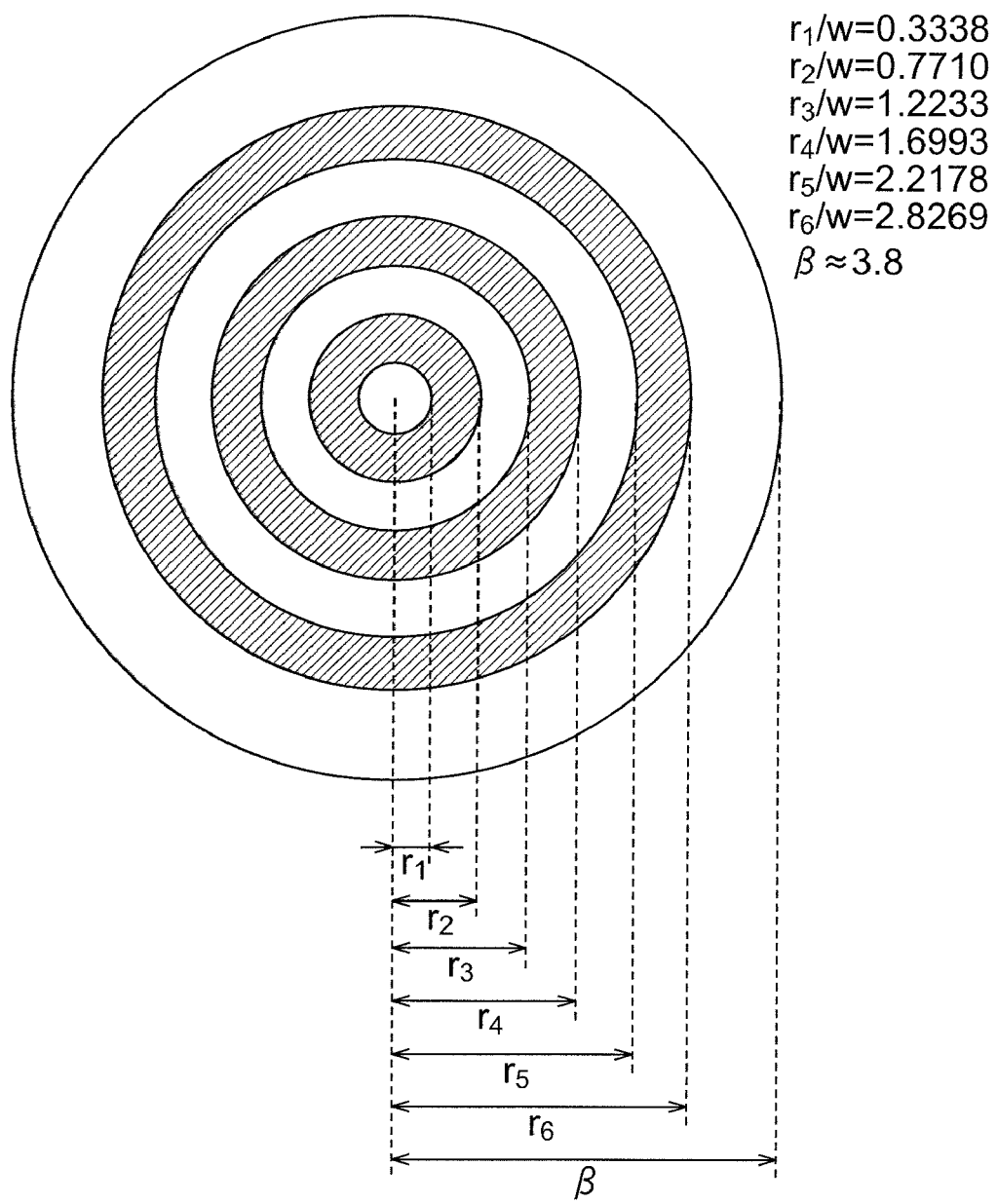
FIG. 12 is a plan view of the optical mask 15 when the radial index p is set to 6.

FIG. 10 is a plan view of the optical mask 15 when the radial index p is set to 2. FIG. 11 is a plan view of the optical mask 15 when the radial index p is set to 4. FIG. 12 is a plan view of the optical mask 15 when the radial index p is set to 6. In these figures, the optical mask 15 is also viewed in the optical axis direction. In these figures, the values ($r_i$/w) obtained by normalizing the radiuses $r_i$ of the circumferences which are boundaries of the (p+1) regions $A_0$ to $A_p$ by a beam waist radius w and values of β are shown.

The radiuses $r_i$ (i=1 to p) of the circumferences which are boundaries of the (p+1) regions $A_0$ to $A_p$ are obtained in the same manner as described above according to the Numerical formulas (2) and (3). However, to produce the effect of minimizing the central spot diameter, the ratio β of the beam radius w to the aperture radius of the lens 16 must be properly set. Specifically, when LG mode light is made incident on the optical mask 15 to form a minute spot with less side lobe, β must be set to a value based on a beam radius parameter w on an entrance pupil plane of the incident LG mode light (that is, wβ as an actual dimension). On the other hand, when light with a fixed phase is made incident on the optical mask 15, only relative values of the respective radius values $r_i$ become significant, however, to produce the same effect as in the case of LG mode light incidence, the relative relationship with β must also be considered.

Generally, β must be larger than at least the outer radius $r_p$ of the outermost light shielding region, and is preferably a value which is not much larger than the range in which electric field amplitude of the incident light is allowed (when p is 2, β is substantially approximately 3).

To obtain a more minute central spot diameter, it is effective that β is set as follows. For example, in the case of LG mode light input with a radius index p of 2, as shown in FIG. 5, when β is substantially 2 without depending on the NA of the lens 16, a minimum focal spot is obtained. This β value is also effective when light with a uniform phase is input into the optical mask 15. Specifically, as shown in FIG. 10, when the radial index p is 2, designing may be performed so that the ratio "$(r_1/w): (r_2/w): \beta = 0.5412: 1.3066: 2.0$" is substantially satisfied and $\beta$ becomes the effective aperture diameter of the lens 16. However, the central spot diameter when the radial index p is 4 or 6 becomes slightly larger than in the case where the radial index p is 2. FIG. 11 and FIG. 12 also show preferable values of $\beta$. To obtain the $\beta$ value preferable with respect to the values of the radial index p, the relationship shown in FIG. 5 must be obtained in advance.

The light shielding regions $A_1, A_3, A_{p-1}$ of the optical mask 15 are regions which block incident light, and the light shielding regions $A_1, A_3, \ldots, A_{p-1}$ may block the light by absorbing, reflecting, or scattering the light. When the light is blocked by being absorbed, the light shielding regions $A_1, A_3, \ldots, A_{p-1}$ are coated with a light-absorbing pigment. When the light is blocked by being reflected, reflective films made of metal, etc., are formed on the light shielding regions $A_1, A_3, \ldots, A_{p-1}$. When the light is blocked by being scattered, rough surface portions are formed by sandblasting, etc., on the light shielding regions $A_1, A_3, \ldots, A_{p-1}$.

Figure 13:
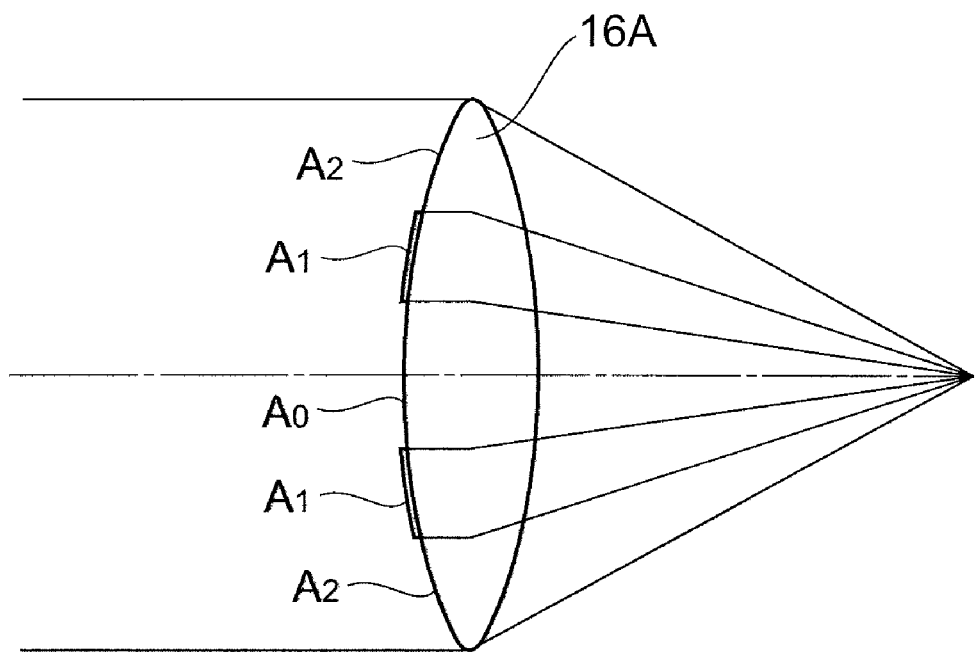
FIG. 13 is a sectional view showing a configuration of a lens 16A when the optical mask is provided at an incidence plane.
Figure 14:
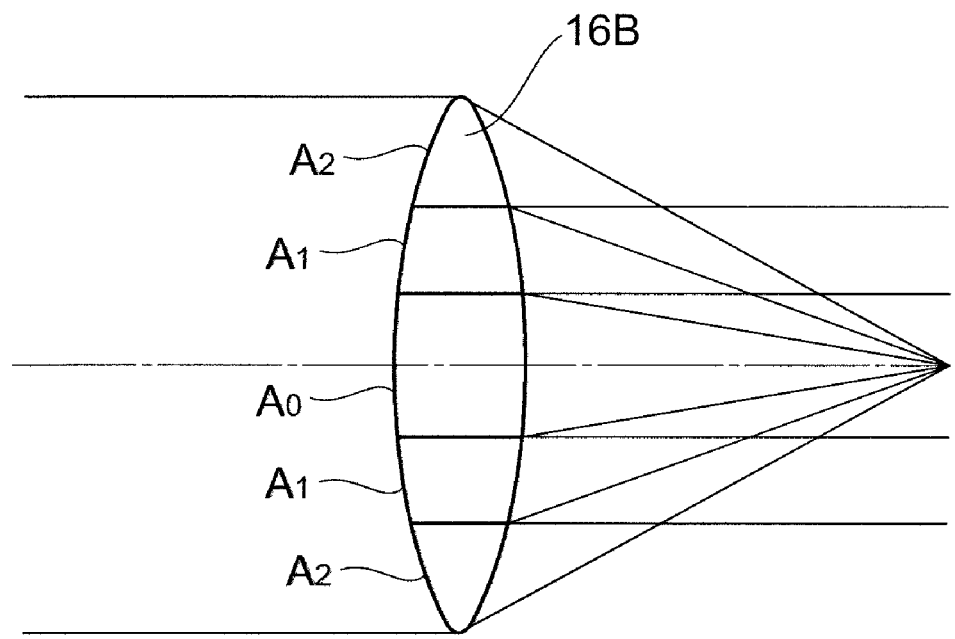
FIG. 14 is a sectional view showing a configuration of a lens 16B which does not have a light condensing effect in a region corresponding to a light shielding region.

What matters is that the light made incident on the light shielding regions $A_1, A_3, \ldots, A_{p-1}$ is not condensed to a focal point by the lens 16 which is a condensing optical system. Therefore, as shown in the sectional view of FIG. 13, the lens 16A is provided with the optical mask at the incidence plane, and in regions corresponding to the light shielding regions $A_1, A_3, \ldots, A_{p-1}$ on the incidence plane of the lens 16A, light may be blocked by being absorbed, by being reflected, or by being scattered. As shown in the sectional view of FIG. 14, the lens 16B may be configured so as not to have the light condensing effect in the regions corresponding to the light shielding regions $A_1, A_3, \ldots, A_{p-1}$, and for example, these regions may be through holes. In this case, light which passed through the through holes goes straight, so that it is not condensed to the focal point.

The invention claimed is:

1. An optical mask which applies spatial intensity modulation to input light in a beam cross-section and outputs a light after being subjected to the modulation, wherein
when regions $A_0$ to $A_p$ defined by circumferences with p radiuses $r_1$ to $r_p$ (p is an even number, $r_p > r_{p-1} > \ldots > r_2 > r_1$, and $r_p - r_{p-1} > r_{p-1} - r_{p-2} > \ldots > r_3 - r_2 > r_2 - r_1 \geq r_1$) around a predetermined position are set in order from an inner side,
a region $A_m$ (m is an even number not less than 0 and not more than p) is a light transmission region, and
a region $A_n$ (n is an odd number not less than 0 and not more than p) is a light shielding region,
wherein $p >= 2$, $p >= m >= 2$, $p > n >= 1$, and m is not equal to 0.

2. The optical mask according to claim 1, wherein the p radiuses $r_1$ to $r_p$ are in proportion to square roots of p real roots of a p-order Laguerre polynomial.

3. A light source device comprising:
a light source which outputs coherent light;
a condensing optical system which condenses light output from the light source to a focal point; and
the optical mask according to claim 1 provided on a light path between the light source and the focal point, wherein
light output from the light source enters the regions $A_0$ to $A_p$ and the optical mask outputs light transmitted through the light transmission regions.

4. The light source device according to claim 3, further comprising:
an optical phase modulation element which is provided between the light source and the optical mask, wherein light output from the light source enters the optical phase modulation element, wherein the optical phase modulation element applies phase modulation to the light according to a position on a beam cross-section of the light, and outputs the light after being subjected to the phase modulation, wherein
in a beam cross-section of light which is output from the optical phase modulation element and input into the optical mask, phases of lights input into the light transmission region and the light shielding region, respectively, are different by $\pi$ from each other.

5. The light source device according to claim 4, wherein the optical phase modulation element outputs LG mode light with a radial index p by applying phase modulation to input light.

6. The light source device according to claim 4, wherein the optical phase modulation element is an element having phase modulation amounts of pixels set based on a control signal input from an outside.

* * * * *